United States Patent
Hisashuku

(10) Patent No.: US 11,840,829 B2
(45) Date of Patent: Dec. 12, 2023

(54) PIPE JOINT AND PIPING STRUCTURE

(71) Applicant: SEKISUI CHEMICAL CO., LTD., Osaka (JP)

(72) Inventor: Daiki Hisashuku, Ritto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 81 days.

(21) Appl. No.: 17/439,975

(22) PCT Filed: Mar. 19, 2020

(86) PCT No.: PCT/JP2020/012452
§ 371 (c)(1),
(2) Date: Sep. 16, 2021

(87) PCT Pub. No.: WO2020/196318
PCT Pub. Date: Oct. 1, 2020

(65) Prior Publication Data
US 2022/0186479 A1  Jun. 16, 2022

(30) Foreign Application Priority Data

Mar. 22, 2019 (JP) ................................. 2019-054448
Sep. 11, 2019 (JP) ................................. 2019-165664

(51) Int. Cl.
*C08J 9/04* (2006.01)
*E03C 1/12* (2006.01)
(Continued)

(52) U.S. Cl.
CPC .................. *E03C 1/12* (2013.01); *B32B 1/08* (2013.01); *B32B 27/065* (2013.01);
(Continued)

(58) Field of Classification Search
CPC . F16L 47/06; F16L 47/12; F16L 47/20; F16L 47/26; F16L 47/32; F16L 41/02;
(Continued)

(56) References Cited

U.S. PATENT DOCUMENTS 3,458,619 A * 7/1969 Prochaska ............... F16L 47/32
285/133.11
3,650,549 A * 3/1972 Pepper ................. F16L 27/1274
285/302
(Continued)

FOREIGN PATENT DOCUMENTS

CN 1986635 6/2007
CN 102159868 8/2011
(Continued)

OTHER PUBLICATIONS

International Search Report dated May 26, 2020 in International (PCT) Application No. PCT/JP2020/012452.
(Continued)

*Primary Examiner* — Michael C Romanowski
(74) *Attorney, Agent, or Firm* — Wenderoth, Lind & Ponack, L.L.P.

(57) ABSTRACT

A pipe joint (1) comprising: a tubular main body (10) having a flow path inside, which is formed of a resin comprising a copolymer having one or more selected from a vinyl cyanide monomer unit and an acrylic monomer unit, a rubber component, and an aromatic vinyl monomer unit; and a socket section (20a) integrally formed with the main body (10), wherein: the main body (10) has a foamed resin layer (30) and a non-foamed resin layer (50) covering the foamed resin layer (30); the amount of the rubber component in the foamed resin layer (30) as determined by pyrolysis-gas chromatography/mass spectrometry is within a specific range; the amount of the rubber component in the non-foamed resin layer (50) is within a specific range; and a ratio (Continued)

($L_a/L_a$) of length ($L_a$) from a base end (21a) to an opening end (22a) of the socket section (20a) to a thickness ($d_a$) of the socket section (20a) at the opening end is 2.0 or more and 10.0 or less.

10 Claims, 2 Drawing Sheets

(51) Int. Cl.

| | |
|---|---|
| F16L 47/06 | (2006.01) |
| F16L 47/20 | (2006.01) |
| F16L 47/32 | (2006.01) |
| F16L 59/02 | (2006.01) |
| F16L 11/12 | (2006.01) |
| F16L 13/10 | (2006.01) |
| F16L 21/00 | (2006.01) |
| F16L 58/18 | (2006.01) |
| F16L 59/16 | (2006.01) |
| B32B 1/08 | (2006.01) |
| B32B 27/06 | (2006.01) |
| B32B 27/30 | (2006.01) |
| G01N 30/72 | (2006.01) |
| G01N 30/88 | (2006.01) |

(52) U.S. Cl.
CPC .............. *B32B 27/302* (2013.01); *C08J 9/04* (2013.01); *F16L 11/125* (2013.01); *F16L 13/103* (2013.01); *F16L 21/00* (2013.01); *F16L 47/06* (2013.01); *F16L 47/20* (2013.01); *F16L 47/32* (2013.01); *F16L 58/185* (2013.01); *F16L 59/02* (2013.01); *F16L 59/163* (2013.01); *B32B 2307/304* (2013.01); *B32B 2355/00* (2013.01); *B32B 2355/02* (2013.01); *B32B 2597/00* (2013.01); *G01N 30/72* (2013.01); *G01N 30/88* (2013.01); *Y10T 428/1376* (2015.01); *Y10T 428/1393* (2015.01)

(58) Field of Classification Search
CPC ....... F16L 41/021; F16L 33/003; F16L 33/01; F16L 58/185; F16L 59/14; F16L 59/147; B32B 1/08; B32B 27/065; B32B 2038/0084; B32B 2266/0228; B29K 2025/08; B29K 2033/12; G01N 30/72; G01N 30/88; C08J 9/04
USPC .............. 428/34.1–36.92; 285/133.11–133.6
See application file for complete search history.

(56) References Cited

U.S. PATENT DOCUMENTS

| | | | | |
|---|---|---|---|---|
| 5,058,934 | A | * 10/1991 | Brannon | ................ F16L 27/111 285/294.1 |
| 2006/0249216 | A1 | * 11/2006 | Sexton | ................ B29C 45/1642 138/141 |
| 2008/0084059 | A1 | * 4/2008 | Meier | ................... F16L 59/143 285/47 |
| 2009/0159146 | A1 | * 6/2009 | Jackson | ................... F16L 59/20 138/146 |
| 2011/0049874 | A1 | * 3/2011 | Parker | ................... B29C 66/131 285/337 |
| 2017/0335088 | A1 | * 11/2017 | Noguchi | ................... C08K 3/40 |
| 2022/0136626 | A1 | * 5/2022 | Schneider | ............. F16L 13/116 285/295.3 |

FOREIGN PATENT DOCUMENTS

| | | | | |
|---|---|---|---|---|
| JP | 11-201382 | | 7/1999 | |
| JP | 2004-51874 | | 2/2004 | |
| JP | 2012-107669 | | 6/2012 | |
| JP | 2012107669 | A | * 6/2012 | ............. F16L 59/18 |
| JP | 2017-155868 | | 9/2017 | |
| JP | 2019-173968 | | 10/2019 | |
| WO | 2019/065834 | | 4/2019 | |

OTHER PUBLICATIONS

Eslon AC Drain Pipe/Fitting Catalog (Revised 6th Edition), Japan, Sekisui Chemical Co., Ltd., Jan. 2014, cited in CB as Citation 2.
Office Action dated Apr. 5, 2022 in Japanese Patent Application No. 2021-509337, with English-language translation.
Office Action dated Aug. 25, 2022 in Chinese Patent Application No. 202080022179.4, with English-language translation.
Zhimian Qian, A Handbook of Plastic Performance Application, Shanghai Science and Technology Literature Press, Mar. 31, 1987, pp. 1-3.
Office Action dated Jan. 18, 2022, in Japanese Patent Application No. 2021-509337, with Machine English-language translation.
Beijing Institute of Press, Case Analysis of Graduation Design Guidance (Mechanical), Aug. 31, 2009, p. 158 (concise description of relevance provided by REF CB).
Office Action dated Apr. 12, 2023, in corresponding Chinese Patent Application No. 2020800221794, with partial English language translation.

\* cited by examiner

PIPE JOINT AND PIPING STRUCTURE

TECHNICAL FIELD

The present invention relates to a pipe joint used for connecting drainpipes or the like, and a piping structure. Priorities are claimed on Japanese Patent Application No. 201.9-54448, filed Mar. 22, 2019, and Japanese Patent Application No. 2019-165664, filed Sep. 11, 2019, the contents of which are incorporated herein by reference.

BACKGROUND ART

Conventionally, for steel pipes or synthetic resin pipes used for draining condensed water (drain water) generated from an air conditioner, it has been general practice to cover exterior of such pipes with a heat insulating material such as glass wool, to thereby prevent moisture condensation or the like from occurring on the pipes.

However, such conventional method requires labor for winding or covering the heat insulating material as well as labor for piping. Therefore, the labor efficiency of the method is poor, and a narrow work space in some cases does not allow the necessary operation to be implemented.

For example, Patent Document 1 proposes a resin pipe joint having a foamed resin layer serving as a heat insulating layer. In the pipe joint of Patent Document 1, the heat insulating layer enables prevention of dew condensation even if the pipes are not covered with a heat insulating material after the implementation of piping.

DESCRIPTION OF PRIOR ART

Patent Document

Patent Document 1: Japanese Unexamined Patent Application Publication No. 2017-155868

DISCLOSURE OF INVENTION

Problems to be Solved by the Invention

However, for further improving the heat insulation of the pipe joint, it is necessary to increase the thickness of the foamed layer of the pipe joint or the expansion ratio of the foamed layer.

If the thickness of the foamed layer of the pipe joint is increased, the weight of the pipe joint increases as well, raising a risk of the pipe joint being damaged by an impact such as dropping. When the expansion ratio of the foamed layer is increased, the strength of the pipe joint is lowered, raising a risk of the pipe joint being damaged by an impact such as dropping.

In addition, the pipe joint is required to be made to have a desired shape (moldability), and prevent water leakage from a joint section (in a piping structure) with the pipe (water cut-off performance).

It is an object of the present invention to provide a pipe joint and a piping structure that not only show sufficient heat insulation performance even without increasing the thickness or expansion ratio of the foamed layer, but also are excellent in moldability, water cut-off performance and strength.

Means to Solve the Problems

Embodiments of the present invention made in order to solve the above-mentioned problem are as enumerated below.

[1] A pipe joint including: a tubular main body having a flow path inside, which is formed of a resin comprising a copolymer of one or more selected from a vinyl cyanide monomer unit and an acrylic monomer unit, a rubber component, and an aromatic vinyl monomer unit; and a socket section integrally formed with the main body, wherein: the main body has a foamed resin layer and a non-foamed resin layer covering the foamed resin layer; the amount of the rubber component in the foamed resin layer is 10% by mass or more and 45% by mass or less, based on a total mass of the resin contained in the foamed resin layer, as determined by pyrolysis-gas chromatography/mass spectrometry; the amount of the rubber component in the non-foamed resin layer is 10% by mass or more and 45% by mass or less, based on a total mass of the resin contained in the non-foamed resin layer, as determined by pyrolysis-gas chromatography/mass spectrometry; and a ratio L/d of length L from a base end to an opening end of the socket section to a thickness d of the socket section at the opening end is 2.0 or more and 10.0 or less.

[2] The pipe joint according to [1], wherein the main body has a thermal resistance of 0.04 K/W or more.

[3] A piping structure including the pipe joint of [1] or [2], and a pipe inserted into and connected to the socket section of the pipe joint.

Effect of the Invention

The pipe joint and the piping structure of the present invention not only show sufficient heat insulation performance even without increasing the thickness or expansion ratio of the foamed layer, but also are excellent in moldability, water cut-off performance and strength.

DESCRIPTION OF THE EMBODIMENTS

[Pipe Joint]

Hereinbelow, the pipe joint according to the embodiment of the present invention is described with reference to the drawings.

Figure 1:
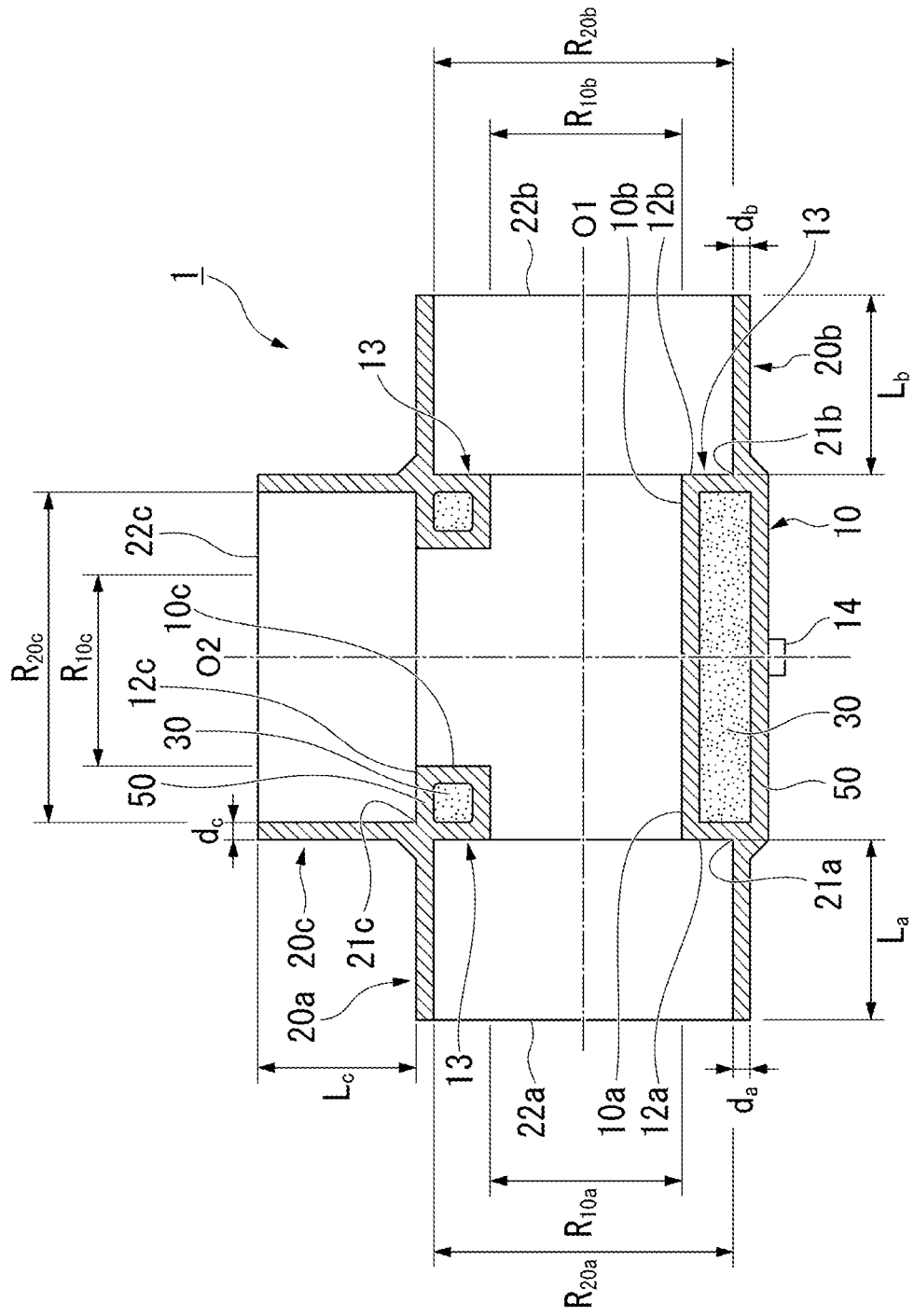
FIG. 1 is a cross-sectional view showing a pipe joint according to one embodiment of the present invention.

FIG. 1 shows one example of the pipe joint 1 of the present embodiment, which is a joint used for connecting drain pipes (a three-way branched, T-shaped pipe joint generally called "tee"). The pipe joint 1 has a first tube axis O1 and a second tube axis O2. The two tube axes O1 and O2 intersect each other at an angle of 90.0°±1.1°.

The pipe joint 1 has a tubular main body 10 having a flow path (for example, a drain flow path) inside, and three socket sections 20a, 20b, and 20c integrally formed with the main body 10.

The main body 10 includes a foamed resin layer 30 and a non-foamed resin layer 50. Both surfaces of the foamed resin layer 30 are covered with the non-foamed resin layer 50. That is, the wall of the main body 10 has a three-layer structure in which the non-foamed resin layer 50, the foamed resin layer 30, and the non-foamed resin layer 50 are positioned in this order as viewed from the flow path side. The socket section 20a, the socket section 20b, and the socket section 20c are each formed of a non-foamed resin layer 50. That is, the walls of the socket section 20a, the socket section 20b, and the socket section 20c each have a single-layer structure formed of the non-foamed resin layer 50.

For enhancing water cut-off performance, the socket sections 20a, 20b, and 20c are preferably transparent. That is, the non-foamed resin layer 50 is preferably transparent for easy observation of the connection between the pipe joint 1 and the pipes inserted and connected to the socket sections thereof. In this context, "transparent" means a transparency of a degree that allows the pipe inserted or the adhesive applied to the inner surface of the socket section to be visible from the outside of the socket section, and may be translucent or colored transparent.

More specifically, the haze of the socket section measured according to JIS K 7136: 2000 is preferably 1 or more and 70 or less, and more preferably 1 or more and 60 or less.

Cylindrical socket sections 20a and 20h are provided in the openings 10a and 10b formed at both ends of the main body 10 (forming a straight pipe) in the direction of the first tube axis O1.

A cylindrical socket section 20c is provided in the opening 10c formed in the main body 10 in the direction of the second tube axis O2.

In the main body 10, an injection gate portion 14 is positioned facing the opening 10c across the first tube axis O1. During molding, the injection is implemented through this injection gate portion 14.

in order to insert and connect a pipe having a foamed layer, the inner diameter $R_{20a}$ of the socket section 20a is larger than the inner diameter $R_{10a}$ of the opening 10a of the main body 10. Specifically, the ratio $R_{20a}/R_{10a}$ is preferably more than 1.0 and 2.0 or less, more preferably 1.2 or more and 1.8 or less, and even more preferably 1.4 or more and 1.6 or less.

Similarly, the inner diameter $R_{20b}$ of the socket section 20b is larger than the inner diameter $R_{10b}$ of the opening 10b of the main body 10. Specifically, the ratio $R_{20b}/R_{10b}$ is preferably more than 1.0 and 2.0 or less, more preferably 1.2 or more and 1.8 or less, and even more preferably 1.4 or more and 1.6 or less.

Similarly, the inner diameter $R_{20b}$ of the socket section 20c is larger than the inner diameter $R_{10b}$ of the opening 10b of the main body 10. Specifically, the ratio $R_{20b}/R_{10b}$ is preferably more than 1.0 and 2.0 or less, more preferably 1.2 or more and 1.8 or less, and even more preferably 1.4 or more and 1.6 or less.

At the boundary between the socket section 20a and the main body 10, a step 12a is formed due to the difference between the inner diameter $R_{20a}$ and the inner diameter $R_{10a}$. The step 12a functions as a stopper for preventing the pipe inserted into the socket section 20a from going further from there.

At the boundary between the socket section 20b and the main body 10, a step 12b is formed due to the difference between the inner diameter $R_{20b}$ and the inner diameter $R_{10b}$. The step 12b functions as a stopper for preventing the pipe inserted into the socket section 20b from going further from there.

At the boundary between the socket section 20c and the main body 10, a step 12c is formed due to the difference between the inner diameter $R_{20c}$ and the inner diameter $R_{10c}$. The step 12c functions as a stopper for preventing the pipe inserted into the socket section 20c from going further from there.

The step 12a is formed by the peripheral wall 13 located on the peripheral edge of the opening 10a of the main body 10. The peripheral wall 13 is formed over a full circle of the inner peripheral surface of the cylindrical socket section 20a, and has an annular shape.

The step 12b is formed by the peripheral wall 13 located on the peripheral edge of the opening 10b of the main body 10. The peripheral wall 13 is formed over a full circle of the inner peripheral surface of the cylindrical socket section 20b, and has an annular shape.

The step 12c is formed by the peripheral wall 13 located on the peripheral edge of the opening 10c of the main body 10. The peripheral wall 13 is formed over a full circle of the inner peripheral surface of the cylindrical socket section 20c, and has an annular shape.

The peripheral wall 13 is solid. The inside of the peripheral wall 13 is composed of a foamed resin layer 30, and the foamed resin layer 30 is covered with the non-foamed resin layer 50.

It is preferable that the foamed resin layer 30 is formed on the peripheral wall 13 over its entire region. When the foamed resin layer 30 is formed over the entire region of the peripheral wall 13, the heat insulation is also imparted to the base ends of the socket sections 20a, 20b and 20c, and the heat insulation performance of the pipe joint 1 can be further enhanced.

When the pipe inserted into the socket section 20a, 20b, or 20c has a foamed layer, it is preferable to provide an annular water stopper between the end face of the pipe and the peripheral wall 13. Examples of the annular water stopper include foamed packing and the like.

When the foamed layer of the pipe has an open cell structure, it is preferable to provide an annular water stopper between the end face of the pipe and the peripheral wall 13. The water stopper can prevent drain water from entering the foamed layer of the pipe.

When the foamed layer of the pipe has a closed cell structure, it is not necessary to provide a water stopper between the end face of the pipe and the peripheral wall 13. However, when the pipe is cut diagonally, drain water may stay between the end face of the pipe and the peripheral wall 13, so that it is preferable to provide a water stopper.

The socket section 20a extends from the base edge 21a in the direction of the first tube axis O1. The base edge 21a is positioned at the boundary between the socket section 20a and the main body 10. The distance from the base edge 21a of the socket section 20a to the opening end 22a is $L_a$. The length $L_a$ is equal to the socket length of the socket section 20a. The thickness of the socket section 20a at the opening end 22a is $d_a$. The thickness $d_a$ is equal to the socket thickness of the socket section 20a.

The socket section 20b extends from the base edge 21b in the direction of the first tube axis O1. The base edge 21b is positioned at the boundary between the socket section 20b and the main body 10. The distance from the base edge 21b of the socket section 20b to the opening end 22b is $L_b$. The length $L_b$ is equal to the socket length of the socket section 20b. The thickness of the socket section 20b at the opening end 22b is $d_b$. The thickness $d_b$ is equal to the socket thickness of the socket section 20b.

The socket section 20c extends from the base edge 21c in the direction of the second tube axis O2. The base edge 21c is positioned at the boundary between the socket section 20c and the main body 10. The distance from the base edge 21c of the socket section 20c to the opening end 22c is $L_c$. The length $L_c$ is equal to the socket length of the socket section 20c. The thickness of the socket section 20c at the opening end 22c is $d_c$. The thickness $d_c$ is equal to the socket thickness of the socket section 20c.

The ratio of the length $L_a$ from the base end 21a to the opening end 22a of the socket section 20a relative to the thickness $d_a$ of the socket section 20a at the opening end 22a (hereinafter, also referred to as "$L_a/d_a$ ratio") is 2.0 or more and 10.0 or less, preferably 2.0 or more and 9.0 or less, more preferably 2.5 or more and 8.0 or less, even more preferably 3.0 or more and 7.0 or less, and particularly preferably 3.5 or more and 6.0 or less.

When the $L_a/d_a$ ratio is not less than the lower limit value described above, it is easy to prevent the foamed resin layer 30 from intruding into the socket 20a, and it is easy to suppress a decrease in the strength of the socket 20a. Further, when the $L_a/d_a$ ratio is not less than the lower limit value described above, the length $L_a$ of the socket section 20a is sufficiently large so as to achieve sufficient connection strength of the pipe or the like to be inserted into the pipe joint 1, so that the water cut-off performance can be further enhanced.

When the $L_a/d_a$ ratio is not more than the upper limit described above, the thickness $d_a$ is sufficiently large, so that the pipe joint 1 becomes less likely to be broken by expansion/contraction fatigue resulting from expansion and contraction of the pipe joint 1. Further, when the $L_a/d_a$ ratio is not more than the upper limit value described above, the length $L_a$ is not too large, so that it is easy to fill the resin to the end of the mold cavity, and molding defects due to insufficient filling (also referred to as "short shot") are less likely to occur. That is, when the $L_a/d_a$ ratio is not more than the upper limit value described above, the moldability of the pipe joint 1 can be further enhanced.

The $L_a/d_a$ ratio can be adjusted by the shape of the molding die.

The $L_b/d_b$ ratio at the socket section 20b of the pipe joint 1 is the same as the $L_a/d_a$ ratio.

The $L_c/d_c$ ratio at the socket section 20c of the pipe joint 1 is the same as the $L_a/d_a$ ratio.

The melt mass flow rate (hereinafter, also referred to as "MFR") of the pipe joint 1 is preferably, for example, 3 g/1.0 min or more and 90 g/10 min or less, more preferably 4 g/10 min or more and 80 g/10 min or less, even more preferably 5 g/10 min or more and 70 g/10 min or less, and particularly preferably 6 g/10 min or more and 60 g/10 min or less. When the MFR of the pipe joint 1 is not less than the lower limit value described above, it is easy to fill the resin to the end of the mold cavity during the production of the pipe joint 1, so that molding defects, which are particularly likely to occur at the socket section due to insufficient filling, can be prevented. That is, when the MFR of the pipe joint 1 is not less than the lower limit value described above, the moldability of the pipe joint 1 can be further improved. When the MFR of the pipe joint 1 is not more than the upper limit value described above, the molecular weight is not too low, and the pipe joint 1 excels in strength and chemical resistance.

The MFR of the pipe joint 1 can be measured at a test temperature of 220° C. and a test load of 10 kg according to JIS K 7210: 1999.

The thermal resistance of the main body 10 is preferably 0.04 K/W or more, more preferably 0.05 K/W or more and 0.50 K/W or less, even more preferably 0.06 K/W or more and 0.45 K/W or less, particularly preferably 0.07 K/W or more and 0.40 K/W or less, and most preferably 0.08 K/W or more and 0.35 K/W or less. When the thermal resistance of the main body 10 is not less than the lower limit value described above, the heat insulation of the pipe joint 1 can be further improved. When the thermal resistance of the main body 10 is not more than the upper limit value described above, not only is the strength of the main body 10 sufficient, but also the weight of the pipe joint 1 can be reduced.

The thermal resistance of the main body 10 can be increased by reducing the thermal conductivity of the main body 10 through adjustment of the composition and type of the resin containing the copolymer to be described below, the molding conditions for the pipe joint 1, etc., or by increasing the thickness (wall thickness) of the main body 10.

The outer diameter of a general drain pipe is 30 mm to 80 mm, and the wall thickness is about 5 mm to 10 mm. The wall thickness of the main body of the pipe joint 1 used for connecting such a drain pipe is 8 mm or more and 20 mm.

The thermal resistance of the main body 10 is calculated by the following formula (1) from a thermal conductivity (Wm·K) measured in accordance with JIS A 1412-1: 2016 and the thickness (m) of the main body 10 at the site for the thermal conductivity measurement.

$$\text{Thermal resistance (K/W)} = \text{thickness (m)/thermal conductivity (W/m·K)} \quad (1)$$

<Foamed Resin Layer>

The foamed resin layer 30 is formed by foaming and molding a foamable resin composition. The pipe joint 1 of the present embodiment shows excellent heat insulation performance due to the foamed resin layer 30 possessed by the pipe joint 1.

The expansion ratio of the foamed resin layer 30 is preferably 1.0 time or more and 8.0 times or less, more preferably 1.1 times or more and 5.0 times or less, and even more preferably 1.2 times or more and 3.0 times or less.

With the expansion ratio being adjusted within the above range, it is possible to achieve high heat insulation performance and high impact resistance simultaneously.

The expansion ratio can be adjusted by the type or amount of the resin, the type or amount of the blowing agent, the production conditions, and the like.

The expansion ratio is measured according to the method of 6.2(a) or 6.2(b) prescribed in JIS K 9798: 2006.

In the foamed resin layer 30, a plurality of cells are formed with substantially no pores in the cell walls thereof, and at least a part of the cells are closed cells not communicating with each other.

The closed cell ratio is preferably 85% or more, and more preferably 90% or more. The upper limit is not particularly limited, but is 99% or less from a practical point of view. When the closed cell ratio is within the above range, a low thermal conductivity can be maintained for a long time, and a further improved heat insulation can be achieved. The closed cell ratio is measured in accordance with JIS K 7138: 2006.

<Foamable Resin Composition>

The foamable resin composition of the present embodiment includes: a resin (hereinafter, also referred to as "first resin") including a copolymer having one or more selected from a vinyl cyanide monomer unit and an acrylic monomer unit, a rubber component and an aromatic vinyl monomer unit; and a blowing agent.

In the present specification, the "unit" refers to a structure derived from a monomeric compound (monomer) before polymerization. For example, the "vinyl cyanide monomer unit" refers to a structure in a polymer, which is derived from a vinyl cyanide monomer (acrylonitrile). The amount (ratio) of each monomer unit in the polymer corresponds to the amount (ratio) of the monomer in a monomer mixture used for producing the polymer.

(First Resin)

The first resin contains a copolymer having one or more selected from a vinyl cyanide monomer unit and an acryl monomer unit, a rubber component and an aromatic vinyl monomer unit.

The copolymer of the present embodiment is preferably a resin obtained by polymerizing one or more selected from a vinyl cyanide monomer and an acryl monomer with an aromatic vinyl monomer in the presence of a rubber component. In this instance, the copolymer is a so-called "graft copolymer". However, in the present invention, the copolymer is not limited to one obtained by graft copolymerization, and may be one produced by a polymer blending method.

In the present specification, the rubber component refers to a diene rubber such as polybutadiene or polyisoprene, or an acrylic rubber.

Examples of the diene rubber as the rubber component include polymers of diene compounds such as butadiene, isoprene, ethylene, and propylene. Examples of the acrylic rubber as the rubber component include polymers of acrylic esters such as ethyl acrylate, butyl acrylate, butoxyethyl acrylate, and methoxyethyl acrylate.

Examples of the vinyl cyanide monomer include acrylonitrile and methacrylonitrile, of which acrylonitrile is preferable.

Examples of the acrylic monomer include monomers that constitute an acrylic resin. Examples of the acrylic resin include an acrylate polymer and a methacrylate polymer. Examples of the acrylate polymer include polymethyl acrylate, polyethyl acrylate, and polyglycidyl acrylate. Examples of the methacrylate polymer include polymethyl methacrylate, polyethyl methacrylate, and polyglycidyl methacrylate. That is, examples of the acrylic monomer include methyl acrylate, ethyl acrylate, glycidyl acrylate, methyl methacrylate, ethyl methacrylate, glycidyl methacrylate and the like, of which methyl methacrylate is preferable.

Examples of the aromatic vinyl monomer include styrene, α-methylstyrene, β-methylstyrene, 4-methylstyrene, β-bromostyrene and the like, of which styrene and α-methylstyrene are preferable.

Specific examples of the copolymer in the present embodiment include an acrylonitrile-butadiene-styrene copolymer (ABS resin), an acrylonitrile-ethylenepropylene diene-styrene copolymer (AES resin), and an acrylonitrile-acrylic rubber-styrene copolymer (AAS resin), methyl methacrylate-butadiene-styrene copolymer (MBS resin) and the like. Further, a mixture of any of these copolymers may also be used.

The first resin has a rubber component content of 10% by mass or more and 45% by mass or less, preferably 15% by mass or more and 40% by mass or less, and more preferably 20% by mass or more and 35% by mass or less, based on the total mass of the first resin. When the rubber component content is not less than the lower limit value described above, the strength of the pipe joint 1 can be easily increased. When the rubber component content is not more than the upper limit value described above, it is easy to improve the fluidity during the molding of the pipe joint 1.

Further, it is also one of the preferable embodiments of the present invention that the rubber component in the first resin contains both a diene rubber and an acrylic rubber. The presence of both the diene rubber and the acrylic rubber in the rubber component improves the chemical resistance as well as the impact resistance.

When the rubber component contains both the diene rubber and the acrylic rubber, the amount of the diene rubber is preferably 5% by mass or more and 40% by mass or less, more preferably 10% by mass or more and 40% by mass or less, even more preferably 15% by mass or more and 40% by mass or less, and particularly preferably 20% by mass or more and 40% by mass or less, based on the total mass of the first resin.

When the rubber component contains both the diene rubber and the acrylic rubber, the amount of the acrylic rubber is preferably 0.1% by mass or more and 10% by mass or less, more preferably 0.3% by mass or more and 5% by mass or less, and even more preferably 0.5% by mass or more and 3% by mass or less, based on the total mass of the first resin. When the amount of the acrylic rubber is within the above numerical range, the chemical resistance can be further improved particularly when the amount of the diene rubber is 15% by mass or more, based on the total mass of the first resin. In this context, the "amount of the acrylic rubber" means the amount of the acrylic acid ester added to the first resin.

The amount of the vinyl cyanide monomer unit in the first resin is preferably 10% by mass or more and 50% by mass or less, and more preferably from 15% by mass or more and 45% by mass or less, based on the total mass of the first resin. When the amount of the vinyl cyanide monomer unit is not less than the lower limit value described above, the tensile strength can be improved. When the amount of the vinyl cyanide monomer unit is not more than the upper limit value described above, the impact strength can be improved.

The amount of the acrylic monomer unit in the first resin is preferably 20% by mass or more and 60% by mass or less, and more preferably from 30% by mass or more and 50% by mass or less, based on the total mass of the first resin. When the amount of the acrylic monomer unit is within the above numerical range, the strength and transparency of the pipe joint 1 can be easily increased. Therefore, the water cut-off performance of the pipe joint 1 can be further improved.

The amount of the aromatic vinyl monomer unit in the first resin is preferably 15% by mass or more and 60% by mass or less, and more preferably 20% by mass or more and 50% by mass or less, based on the total mass of the first resin. When the amount of the aromatic vinyl monomer unit is not less than the lower limit value described above, the indentation hardness can be improved. When the amount of the aromatic vinyl monomer unit is not more than the upper limit value described above, the impact strength can be improved.

The first resin may contain an optional monomer unit other than the vinyl cyanide monomer unit, the acrylic monomer unit and the aromatic vinyl monomer unit. Examples thereof include a polycarbonate resin and a monomer thereof.

The amounts of the components in the first resin can be determined through analysis by way of pyrolysis-gas chromatography/mass spectrometry (hereinafter, also referred to as "PGC/MS").

The conditions for measurement by way of PGC/MS are, for example, as shown below.

[Measurement Conditions]

Apparatus

Pyrolysis device: PY-2020iD (Frontier Lab Co., Ltd.)
Gas chromatograph: GC 2010 (Shimadzu Corporation)
Mass spectrometer: GCMS-QP 2010 (Shimadzu Corporation)

Pyrolysis Conditions

Pyrolysis temperature: 550° C.
Interface temperature: 250° C.

Gas Chromatograph Conditions

Carrier flow rate: 1 ml/min (He)

Split ratio: 100:1
Separation column: DB-1 (1.00 μm, 0.25 mmφ×30 m)
Oven temperature: 40° C. (3 min)-320° C. (10 min)
Mass Spectrometry Conditions
Interface temperature: 250° C.
Ionization temperature: 220° C.
Mass range: 28-700 m/z
Voltage: 1.2 kV A method for determining the amounts of the components contained in the first resin by the PGC/MS measurement is explained below.

First, the components constituting the first resin are subjected to pyrolysis-separation by pyrolysis-gas chromatography to obtain a pyrolysis pattern (pyrogram) in which each component is recorded as a peak. Next, for the peaks of the pyrolysis pattern, corresponding components, i.e., acrylonitrile, rubber component, and styrene, are identified by a mass spectrum obtained by a mass spectrometer.

These components, i.e., acrylonitrile, rubber component, and styrene, have different rates of pyrolytic depolymerization (rates at which the polymers are decomposed into monomers). Therefore, the area (X) of each peak in the pyrogram is divided by the depolymerization rate (Y) of corresponding component to obtain a peak area (Z) of the component. The depolymerization rates (Y) of the components are as follows, acrylonitrile: 0.15, rubber component: 0.10, and styrene: 1.0. Further, for example, when the first resin contains an acrylic resin such as polymethyl methacrylate as the other resin, the depolymerization rate of the acrylic resin is 1.0.

Then, the ratio (Z/T) of the peak area (Z) of each component of the pyrolysis pattern to the sum (T) of the peak areas (Z) is defined as the amount (% by mass) of the component in the first resin.

Table 1 shows an example of the amounts of the components determined by the PGC/MS measurement of an acrylonitrile-butadiene-styrene copolymer (ABS resin) that contains an acrylic resin. In Table 1, the term "retention time" means the time at which each component undergoes pyrolysis to produce a peak in a pyrogram. The term "sample amount" is the mass of the ABS resin subjected to the analysis.

prevented. That is, when the MFR of the foamable resin composition of the present embodiment is not less than the lower limit value described above, the moldability of the pipe joint 1 can be further improved.

When the MFR of the foamable resin composition of the present embodiment is not more than the upper limit value described above, the molecular weight is not too low, and excellent strength and chemical resistance can be achieved.

The MFR of the foamable resin composition of the present embodiment can be measured at a test temperature of 220° C. and a test load of 10 kg according to JLS K 7210: 1999.

The MFR of the foamable resin composition of the present embodiment is the same as that of the pipe joint 1 of the present embodiment.

In the foamable resin composition, the amount of the first resin is preferably 45% by mass or more and 90% by mass or less, and more preferably 50% by mass or more and 85% by mass or less, based on the total mass of the foamable resin composition.

The foamable resin composition of the present embodiment may include other resins than the copolymer having one or more selected from a vinyl cyanide monomer unit and an acrylic monomer unit, a rubber component, and an aromatic vinyl monomer unit.

Examples of the other resins include polyvinyl resins, polyester resins, polyether resins, and polyimide resins. One of these may be used alone, or two or more of these may be used in combination.

In the foamable resin composition, the amount of the copolymer having one or more selected from a vinyl cyanide monomer unit and an acrylic monomer unit, a rubber component and an aromatic vinyl monomer unit is preferably 70% by mass or more and 0.100% by mass or less, and more preferably 85% by mass or more and 100% by mass or less, based on the total mass of the first resin.

(Blowing Agent)

The blowing agent may either be a volatile blowing agent or a decomposable blowing agent.

Examples of the volatile blowing agent include aliphatic hydrocarbons, alicyclic hydrocarbons, halogenated hydrocarbons, ethers, ketones, and the like. Examples of the

TABLE 1

| Retention time (min) | Pyrolysis product | Sample amount (mg) | Peak area (X) | Depolymerization rate (Y) | Peak area (Z) | Sum (T) of peak areas (Z) | Amount (Z/T) (% by mass) |
|---|---|---|---|---|---|---|---|
| 1.72 | Butadiene (rubber component) | 0.3 | 839816 | 0.10 | 8398160 | 146382962 | 6 |
| 2.42 | Acrylonitrile | 0.3 | 4017763 | 0.15 | 26785087 | 146382962 | 18 |
| 5.64 | Methyl methacrylate | 0.3 | 70155381 | 1.00 | 70155381 | 146382962 | 48 |
| 8.08 | Styrene | 0.3 | 41044334 | 1.00 | 41044334 | 146382962 | 28 |

The MFR of the foamable resin composition of the present embodiment is preferably, for example, 3 g/10 min or more and 90 g/10 min or less, more preferably 4 g/10 min or more and 80 g/10 min or less, even more preferably 5 g/10 min or more and 70 g/10 min or less, and particularly preferably 6 g/10 min or more and 60 g/l 0 min or less. When the MFR of the foamable resin composition of the present embodiment is not less than the lower limit value described above, it is easy to fill the resin to the end of the mold cavity, so that molding defects, which are particularly likely to occur at the socket section due to insufficient filling, can be aliphatic hydrocarbon include propane, butane (normal butane, isobutane) and pentane (normal pentane, isopentane, etc.), and examples of the alicyclic hydrocarbon include cyclopentane and cyclohexane. Examples of the halogenated hydrocarbon include one or more halogenated hydrocarbons such as trichlorofluoromethane, trichiorotrifluoroethane, tetrafluoroethane, chlorodifluoroethane, and difluoroethane. Examples of the ether include dimethyl ether and diethyl ether, and examples of the ketone include acetone and methyl ethyl ketone.

Examples of the decomposable blowing agent include inorganic blowing agents such as sodium bicarbonate (sodium hydrogen carbonate), sodium carbonate, ammonium bicarbonate, ammonium nitrite, azide compounds, and sodium borohydride; and organic blowing agents such as azodicarbonamide, barium azodicarboxylate, and dinitrosopentamethylenetetramine.

In addition, gas such as carbon dioxide, nitrogen, and air may be used as the blowing agent as well.

From the viewpoint of excellent foaming performance, decomposable blowing agents are preferable, of which sodium bicarbonate and azodicarbonamide are more preferable.

One of these may be used alone, or two or more of these may be used in combination.

The amount of the blowing agent is preferably 0.1 part by mass or more and 8 parts by mass or less, more preferably 1 part by mass or more and 5 parts by mass or less, and even more preferably 1 part by mass or more and 3 parts by mass or less, with respect to 100 parts by mass of the first resin.

The foamable resin composition of the present embodiment may contain components (optional components) other than the first resin and the blowing agent as long as the effects of the present invention are not impaired.

The amount of the optional component is preferably 50 parts by mass or less, more preferably 30 parts by mass or less, and even more preferably 20 parts by mass or less, with respect to 100 parts by mass of the first resin.

The foamable resin composition of the present embodiment may contain the first resin, the blowing agent, and the optional components. The foamable resin composition may be a pre-formed mixture in which all components are mixed in advance of the molding, or may be an in-situ-formed mixture obtained by mixing some or all of the components in a molding machine. The pre-formed mixture obtained by mixing all the components in advance may be in the form of powder or pellets.

<Non-Foamed Resin Layer>

The non-foamed resin layer 50 is formed by molding a non-foamable resin composition. The pipe joint 1 of the present embodiment shows enhanced strength due to the non-foamed resin layer 50 possessed by the pipe joint 1.

The non-foamed resin layer 50 covers the foamed resin layer 30.

<Non-Foamable Resin Composition>

The non-foamable resin composition of the present embodiment includes: a resin (hereinafter, also referred to as "second resin") which includes a copolymer of one or more selected from a vinyl cyanide monomer unit and an acrylic monomer unit, a rubber component and an aromatic vinyl monomer unit.

(Second Resin)

The second resin is a resin containing a copolymer of one or more selected from a vinyl cyanide monomer unit and an acrylic monomer unit, a rubber component and an aromatic vinyl monomer unit.

The second resin may be the same as or different from the first resin.

The second resin has a rubber component content of 10% by mass or more and 45% by mass or less, preferably 15% by mass or more and 40% by mass or less, and more preferably 20% by mass or more and 35% by mass or less, based on the total mass of the second resin. When the rubber component content is not less than the lower limit value described above, the strength of the pipe joint 1 can be easily increased. When the rubber component content is not more than the upper limit value described above, it is easy to improve the fluidity during the molding of the pipe joint 1.

The second resin constitutes the socket sections 20a, 20b, and 20c. For further enhancing the impact resistance of the pipe joint 1, the amount of the rubber component in the second resin is preferably larger than the amount of the rubber component in the first resin.

In the present specification, when the second resin contains an acrylic monomer unit, the monomer components which form an acrylic rubber are excluded from the rubber component.

Further, it is also one of the preferable embodiments of the present invention that the rubber component in the second resin contains both a diene rubber and an acrylic rubber. The presence of both the diene rubber and the acrylic rubber in the rubber component improves the chemical resistance as well as the impact resistance.

When the rubber component contains both the diene rubber and the acrylic rubber, the amount of the diene rubber is preferably 5% by mass or more and 40% by mass or less, more preferably 10% by mass or more and 40% by mass or less, even more preferably 15% by mass or more and 40% by mass or less, and particularly preferably 20% by mass or more and 40% by mass or less, based on the total mass of the second resin.

When the rubber component contains both the diene rubber and the acrylic rubber, the amount of the acrylic rubber is preferably 0.1% by mass or more and 10% by mass or less, more preferably 0.3% by mass or more and 5% by mass or less, and even more preferably 0.5% by mass or more and 3% by mass or less, based on the total mass of the second resin. When the amount of the acrylic rubber is within the above numerical range, the chemical resistance can be further improved particularly when the amount of the diene rubber is 15% by mass or more, based on the total mass of the second resin. In this context, the "amount of the acrylic rubber" means the amount of the acrylic acid ester added to the first resin.

The amount of the vinyl cyanide monomer unit in the second resin is preferably 10% by mass or more and 50% by mass or less, and more preferably from 15% by mass or more and 45% by mass or less, based on the total mass of the second resin. When the amount of the vinyl cyanide monomer unit is not less than the lower limit value described above, the tensile strength can be improved. When the amount of the vinyl cyanide monomer unit is not more than the upper limit value described above, the impact strength can be improved.

The amount of the acrylic monomer unit in the second resin is preferably 20% by mass or more and 60% by mass or less, and more preferably from 30% by mass or more and 50% by mass or less, based on the total mass of the second resin. When the amount of the acrylic monomer unit is within the above numerical range, the strength and transparency of the pipe joint 1 can be easily increased. Therefore, the water cut-off performance of the pipe joint 1 can be further improved.

The amount of the aromatic vinyl monomer unit in the second resin is preferably 0.15% by mass or more and 60% by mass or less, and more preferably 20% by mass or more and 50% by mass or less, based on the total mass of the second resin. When the amount of the aromatic vinyl monomer unit is not less than the lower limit value described above, the indentation hardness can be improved. When the amount of the aromatic vinyl monomer unit is not more than the upper limit value described above, the impact strength can be improved.

The respective amounts of the components in the second resin can be determined through analysis by way of PGC/MS.

The measurement can be performed under the same conditions as those for the first resin.

The MFR of the non-foamable resin composition of the present embodiment is preferably, for example, 3 g/10 min. or more and 90 g/10 min or less, more preferably 4 g/10 min or more and 80 g/10 min or less, even more preferably 5 g/10 min or more and 70 g/10 min or less, and particularly preferably 6 g/10 min or more and 60 g/10 min or less. When the MFR of the non-foamable resin composition of the present embodiment is not less than the lower limit value described above, it is easy to fill the resin to the end of the mold cavity, so that molding defects, which are particularly likely to occur at the socket section due to insufficient filling, can be prevented. That is, when the MFR of the non-foamable resin composition of the present embodiment is not less than the lower limit value described above, the moldability of the pipe joint 1 can be further improved. When the MFR of the non-foamable resin composition of the present embodiment is not more than the upper limit value described above, the molecular weight is not too low, and excellent strength and chemical resistance can be achieved.

For easier filling of the resin to the end of the mold cavity; the MFR of the non-foamable resin composition is preferably higher than the MFR of the foamable resin composition.

The MFR of the non-foamable resin composition of the present embodiment can be measured by the same method as for the MFR of the foamable resin composition of the present embodiment.

In the non-foamable resin composition, the amount of the second resin is preferably 50% by mass or more and 100% by mass or less, more preferably 70% by mass or more and 100% by mass or less, and even more preferably 80% by mass or more and 100% by mass or less, based on the total mass of the non-foamable resin composition.

The non-foamable resin composition of the present embodiment may include other resins than the copolymer of one or more selected from a vinyl cyanide monomer unit and an acryl monomer unit, a rubber component, and an aromatic vinyl monomer unit.

Examples of the other resins include polyvinyl resins, polyester resins, polyether resins, and polyimide resins. One of these may be used alone, or two or more of these may be used in combination.

In the non-foamable resin composition, the amount of the copolymer of one or more selected from a vinyl cyanide monomer unit and an acrylic monomer unit, a rubber component and an aromatic vinyl monomer unit is preferably 40% by mass or more and 100% by mass or less, more preferably 45% by mass or more and 0.100% by mass or less, and even more preferably 50% by mass or more and 100% by mass or less, based on the total mass of the second resin.

The non-foamable resin composition of the present embodiment may contain components (optional components) other than the second resin as long as the effects of the present invention are not impaired.

Examples of the optional components include colorants, flame retardants, antioxidants, ultraviolet absorbers, light stabilizers, and the like.

The amount of the optional component is preferably 50 parts by mass or less, more preferably 30 parts by mass or less, and still more preferably 20 parts by mass or less, with respect to 100 parts by mass of the second resin.

The non-foamed resin layer 50 does not need to contain the blowing agent, but may contain the blowing agent. The amount of the blowing agent contained in the non-foamed resin layer 50 is preferably from 0 part by mass or more and 8 parts by mass or less, more preferably 0 part by mass or more and 5 parts by mass or less, even more preferably 0 part by mass or more and 3 parts by mass or less, and particularly preferably part by mass or more and 1 parts by mass or less, with respect to 100 parts by mass of the second resin. Further, the expansion ratio of the non-foamed resin layer 50 is preferably 1.0 time, but the non-foamed resin layer with a low expansion ratio of 1.5 times or less is not excluded from the present invention.

The non-foamable resin composition of the present embodiment may include the second resin and optional components. The non-foamable resin composition may be a pre-formed mixture in which all components are mixed in advance of the molding, or may be an in-situ-formed mixture obtained by mixing some or all of the components in a molding machine. The pre-formed mixture obtained by mixing all the components in advance may be in the form of powder or pellets.

The non-foamable resin composition of the present embodiment forms the non-foamed resin layer 50 and covers the outer surface of the pipe joint 1. Further, in the non-foamable resin composition of the present embodiment, the amount of the rubber component in the second resin is 10% by mass or more and 45% by mass or less, based on the total mass of the second resin. Therefore, the non-foamed resin layer 50 is excellent in strength, and the pipe joint 1 is excellent in strength.

<Method for Producing Pipe Joint>

The pipe joint is produced by injection molding or extrusion molding.

For example, a pipe joint having a predetermined expansion ratio can be obtained by a method in which the foamable resin composition is heat-melted and injected into a mold, followed by heating the composition at an arbitrary temperature for an arbitrary time, and then the resulting composition is cooled at an arbitrary temperature for an arbitrary time.

In the case of extrusion molding, the foamable resin composition is foam-molded by a method in which the foamable resin composition is heat-melted, and injected into a mold from an extruder, followed by heating the composition at an arbitrary temperature for an arbitrary time. After cooling at an arbitrary temperature for an arbitrary time, the resulting product is cut into a piece having a predetermined length, thereby obtaining a pipe joint having a predetermined expansion ratio.

In an injection molding machine, the temperature (molding temperature) of the foamable resin composition immediately before being injected into the mold is preferably 200° C. or higher and 280° C. or lower, and more preferably 220° C. or higher and 260° C. or lower. When the molding temperature is within the above numerical range, the foamable resin composition can be sufficiently melted, leading to good fluidity of the foamable resin composition. Further, when the non-foamable resin composition contains an acrylic resin, the transparency of the pipe joint 1 can be enhanced by setting the molding temperature to a value not exceeding the upper limit value described above.

The time for molding in a mold is preferably 1 minute or more and 10 minutes or less. When the time for molding in a mold is not less than the lower limit value described above, the foamable resin composition can be sufficiently cured. When the time for molding in a mold is not more than the upper limit value described above, the productivity of the pipe joint 1 is likely to improve.

Moreover, it is preferable that the non-foamable resin composition is dried in advance. By drying in advance of molding, it is possible to suppress the undesired generation of air bubbles inside and on the surface of the pipe joint due to the moisture formed by evaporation in the molding machine, and to suppress the decrease in transparency of the socket section as well as the decrease in strength of the main body. Examples of drying method include a method of pre-drying the non-foamable resin composition by blowing hot air at 60 to 90° C. for 2 to 6 hours using a hot air dryer such as a hopper dryer or a box-shaped drying furnace.

The pipe joint of the present invention is described in detail above; however, the present invention is not limited to the embodiment described above, and any appropriate modifications can be made as long as such modifications do not deviate from the essence of the present invention.

For example, the pipe joint may have a two-layer structure in which the inner surface to serve as a flow path is formed of a non-foamed resin layer and the outer surface is formed of a foamed resin layer. Alternatively, the pipe joint may have a two-layer structure in which the inner surface to serve as a flow path is formed of a foamed resin layer and the outer surface is formed of a non-foamed resin layer.

Further, for example, the pipe joint may not have a non-foamed resin layer and may have only a foamed resin layer. In that instance, the foamed resin layer may have a rubber component content of 10% by mass or more and 45% by mass or less, based on the total mass of the first resin. When the pipe joint is formed only of the foamed resin layer, it is preferable that the outer surface of the foamed resin layer forms a high-density layer as in the case of the non-foamed resin layer.

The boundary between the main body and the socket section may be curved instead of flat. In such a case, the length L from a base end to an opening end of the socket section can be expressed in terms of the insertion length of the pipe inserted into the socket section (from the opening end of the socket section to the step serving as a stopper).

With respect to the layered structure of the pipe joint of the present invention, as long as the pipe joint has the foamed resin layer, the pipe joint may be a multilayer molded article having a resin layer(s) other than the foamed resin layer. Examples of the other resin layer(s) besides the non-foamed resin layer include the same foamed resin layer as the outer surface, and a foamed resin layer different from the outer surface. The resin used as the raw material of these resin layers may be the same thermoplastic resin as used in the foamed resin layer forming the outer surface, or may be a different thermoplastic resin. For suppressing the delamination between the resin layers, it is preferable that the resin used as the raw material of these resin layers is the same thermoplastic resin as used in the foamed resin layer forming the outer surface.

The pipe joint of the present invention is not limited to the above embodiment, and may be a pipe joint having other shapes than mentioned above, such as an elbow, a nipple or a valve socket.

As described above, the pipe joint of the present invention has a foamed resin layer, which enables the pipe joint to show excellent heat insulation performance.

In addition, the pipe joint of the present invention has a rubber component content of 10% by mass or more and 45% by mass or less, based on the total mass of the resin. This enables the pipe joint of the present invention to show excellent strength.

Further, in the pipe joint of the present invention, the ratio L/d of length L from a base end to an opening end of the socket section to a thickness d of the socket section at the opening end is 2.0 or more and 10.0 or less, and preferably 2.0 or more and 9.0 or less. This enables the pipe joint of the present invention to excel in respect of moldability, water cut-off performance and strength.

[Piping Structure]

The piping structure of the present invention includes the pipe joint of the present invention and a pipe inserted and connected to the socket section of the pipe joint.

The piping structure according to one embodiment of the present invention is described below with reference to the drawings.

Figure 2:
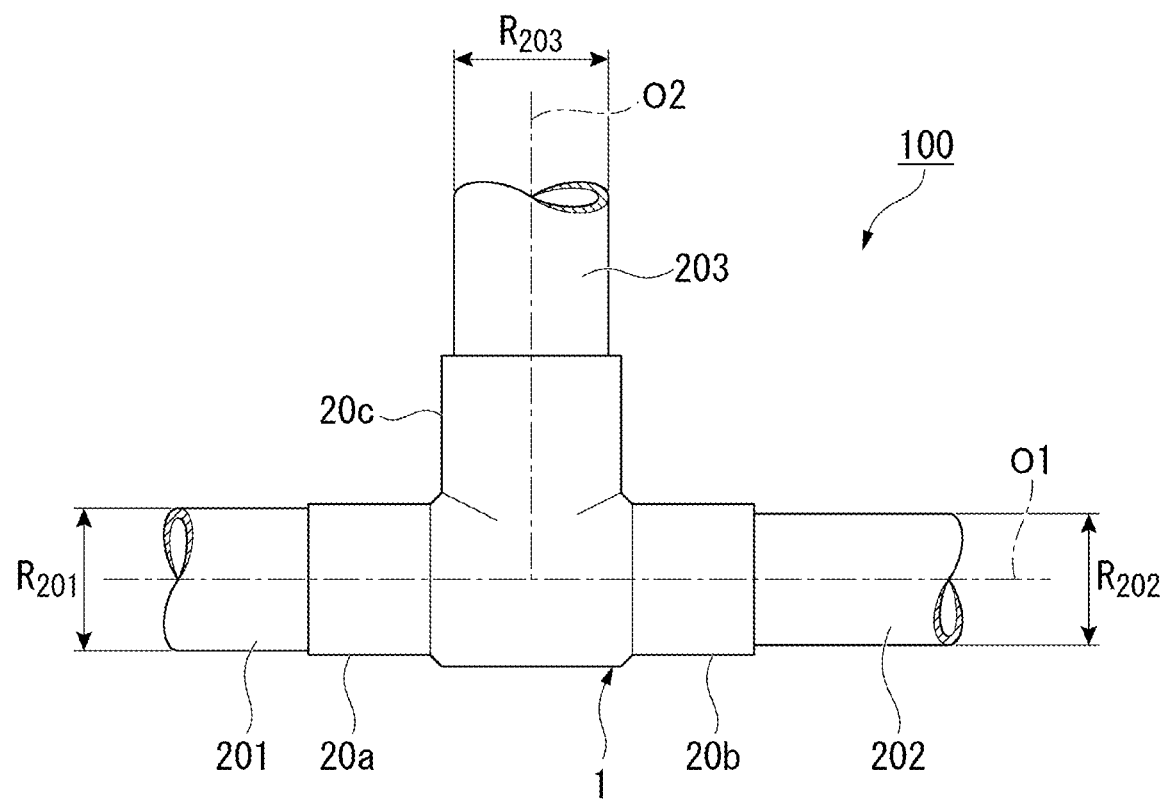
FIG. 2 is a cross-sectional view showing a piping structure according to one embodiment of the present invention.

As shown in FIG. 2, the piping structure 100 includes a pipe joint 1 and three pipes 201, 202 and 203.

The pipe is not particularly limited as long as it can be connected to the pipe joint of the present invention. The pipe may be a steel pipe or a synthetic resin pipe. The pipe is preferably a synthetic resin pipe, more preferably a synthetic resin pipe having a foamed layer, because excellent heat insulation performance can be achieved. The foamed layer may have an open cell structure in which cells communicate with each other, or a closed cell structure in which cells do not communicate with each other, In the present embodiment, the pipe 201 is inserted and connected to the socket section 20a of the pipe joint 1 along the direction of the first tube axis O1. The pipe 202 is inserted and connected to the socket section 20b of the pipe joint 1 along the direction of the first tube axis O1. The pipe 203 is inserted and connected to the socket section 20c of the pipe joint 1 along the direction of the second tube axis O2.

The outer diameter $R_{201}$ of the pipe 201 is slightly smaller than the inner diameter $R_{20a}$ of the socket section 20a. In this context, the inner diameter $R_{20a}$ of the socket section 20a means the inner diameter of the opening end of the socket section 20a, and the ratio $R_{201}/R_{20a}$ is preferably 0.986 to 0.997.

The outer diameter $R_{202}$ of the pipe 202 is slightly smaller than the inner diameter $R_{20b}$ of the socket section 20b. In this context, the inner diameter $R_{20b}$ of the socket section 20b means the inner diameter of the opening end of the socket section 20b, and the ratio $R_{202}/R_{20b}$ is preferably 0.986 to 0.997.

The outer diameter $R_{203}$ of the pipe 203 is slightly smaller than the inner diameter $R_{20c}$ of the socket section 20c. In this context, the inner diameter $R_{20c}$ of the socket section 20c means the inner diameter of the opening end of the socket section 20c, and the ratio $R_{203}/R_{20c}$ is preferably 0.986 to 0.997.

The piping structure 100 functions as a connection of pipes for draining the drain water. In addition, the piping structure 100 functions as a branch section of pipes for draining the drain water.

<Method for Producing Piping Structure>

The method for producing the pipe structure is not particularly limited. The piping structure of the present invention can be obtained by inserting and connecting pipes to the socket sections of the pipe joint of the present invention. The method of connecting the pipe joint and the pipes is not particularly limited, and the connection may be established by using an adhesive or without using an adhesive.

In the piping structure 100 of the present embodiment, the pipe joint 1 and the pipes 201, 202 and 203 are connected by using an adhesive. By connecting the pipe joint and the pipes with an adhesive, the water cut-off performance and strength of the piping structure can be further enhanced.

The adhesive used for connecting the pipe joint and the pipes is not particularly limited, and examples thereof include known adhesives such as instant adhesives and hot melt adhesives.

Since the piping structure of the present invention includes the pipe joint of the present invention, it shows excellent heat insulation performance.

In addition, the piping structure of the present invention is excellent in strength because it includes the pipe joint of the present invention.

Further, since the piping structure of the present invention includes the pipe joint of the present invention, it is excellent in water cut-off performance.

EXAMPLES

Hereinbelow, the present invention will be described in more detail with reference to the Examples which, however, should not be construed as limiting the present invention.

The raw materials and evaluation methods used in the Examples and Comparative Examples are as follows.
[Raw Materials]
<Resin>
ABS resin (ABS resin with a composition as shown in Table 2)
MBS resin (MBS resin with a composition as shown in Table 2)
Acrylic resin (polymethyl methacrylate)
<Rubber Component>
Acrylic rubber (copolymer of acrylonitrile and butyl acrylate)
<Blowing Agent>
ADCA (azodicarbonamide with a trade name "AZ-HM", manufactured by Otsuka Chemical Co., Ltd.)

Example 1

A resin composition obtained by kneading polymethyl methacrylate with an ABS resin was used as a non-foamable resin composition. The kneading was implemented with a mixing ratio such that ratios of peak areas ascribed to the respective components determined by PGC/MS measurement of the non-foamable resin composition were as shown in Table 2. This non-foamable resin composition was pelletized and dried at 70° C. for 4 hours using a known hot air dryer. A mixture of the dried pelletized non-foamable resin composition and azodicarbonamide as a blowing agent was injection-molded as a foamable resin composition at a molding temperature of 240° C., so as to manufacture a DV joint-type tee joint (pipe joint) as shown in FIG. 1 having solid socket sections formed of a non-foamed resin layer, and a formed resin layer with an expansion ratio of 1.8 times. With regard to the dimension of the tee joint, the thickness between the inner and outer wall surfaces at an end of each socket section was 3.7 mm, the length of each socket section was 22 mm, the thickness between the inner and outer wall surfaces of the main body was 10 mm, and the inner diameter of each socket section was 48.3 mm. In Table 2, "methyl methacrylate" means polymethyl methacrylate.

Examples 2 to 4

A tee joint was produced in the same manner as in Example 1 except that the composition of the resin, the thickness between the inner and outer wall surfaces at an end of each socket section, and the length of each socket section were changed as shown in Table 2. In Table 2, "-" indicates that polymethyl methacrylate was not kneaded into the ABS resin.

Example 5

A tee joint was produced in the same manner as in Example 2 except that the thickness between the inner and outer wall surfaces of the main body was changed to 15 mm and the expansion ratio was changed to 1.5 times.

Example 6

A tee joint was produced in the same manner as in Example 2 except that the expansion ratio at the main body was changed to 2.2 times.

Example 7

A tee joint was produced in the same manner as in Example 2 except that the composition of the resin, the thickness between the inner and outer wall surfaces at an end of each socket section, and the length of each socket section were changed as shown in Table 2.

Example 8

A tee joint was produced in the same manner as in Example 2 except that the pelletized non-foamable resin composition was used without drying, and the molding temperature for the injection molding was changed to 195° C.

Examples 9 and 10

A tee joint was produced in the same manner as in Example 2 except that an acrylic rubber was added as a rubber component, and the composition of the resin was changed as shown in Table 2.

Example 11

A tee joint was produced in the same manner as in Example 2 except that the thickness between the inner and outer wall surfaces at an end of each socket section, and the length of each socket section were changed as shown in Table 2.

Comparative Examples 1 and 2

A tee joint was produced in the same manner as in Example 2 except that the composition of the resin was changed as shown in Table 2.

Comparative Example 3

A tee joint was produced in the same manner as in Example 2 except that the thickness between the inner and outer wall surfaces at an end of each socket section, and the length of each socket section were changed as shown in Table 2.

Comparative Example 4

A tee joint was produced in the same manner as in Example 2 except that the composition of the resin, the thickness between the inner and outer wall surfaces at an end of each socket section, and the length of each socket section were changed as shown in Table 2.

[Measurement of MFR]

The MFR of the tee joint produced in each Example and Comparative Example was measured at a test temperature of 220° C. and a test load of 10 kg according to JIS K 7210: 1999. The results are shown in Table 2.

[Measurement of Thermal Resistance]

From the tee joint obtained in each Example and Comparative Example, the main body was cut out and the thermal resistance thereof was calculated by the following formula (1) from a thermal conductivity (W/m·K) measured in accordance with JIS A 1412-1: 2016 and the thickness (m) of the main body at the site for the thermal conductivity measurement. The results are shown in Table 2.

$$\text{Thermal resistance (K/W)} = \text{thickness (m)}/\text{thermal conductivity (W/m·K)} \quad (1)$$

[Measurement of Expansion Ratio]

From the tee joint obtained in each Example and Comparative Example, the main body was cut out, and the expansion ratio thereof was measured in accordance with the method of 6.2(b) prescribed in JIS K 9798: 2006. The results are shown in Table 2.

[Evaluation of Impact Resistance]

The tee joint obtained in each Example and each Comparative Example was used as a test sample. Using a drop tester, the test sample was subjected to an acceleration corresponding to a drop from a height of 4 m so as to collide with a horizontal plane at an angle of 45° formed between the first tube axis O1 and the horizontal plane. Each test sample was tested in this manner three times to evaluate the impact resistance. The impact resistance was evaluated according to the following evaluation criteria by visually checking the presence or absence of cracks in the test sample and chipping of the test sample. The results are shown in Table 2.

》 Evaluation Criteria 》

○: No crack or chipping occurred in the socket section and main body of the test sample.

Δ: Crack or chipping occurred in either the socket section or main body of the test sample.

X: Noticeable crack or chipping occurred in both the socket section and main body of the test sample.

[Evaluation of Chemical Resistance]

From each of the tee joints obtained in the above Examples and Comparative Examples, a dumbbell-shaped test piece was obtained by cutting the socket section thereof in a tube axis direction. The obtained test piece was fixed to a bending jig designed so as to apply a 3 MPa expansion/contraction stress in a room having a temperature of 23° C., and a 10 mm×20 mm cotton having absorbed 2 ml of polyethylene glycol (#200, manufactured by Nacalai tesque, INC.; average molecular weight: 190 to 210) was placed on the center of the test piece. With respect to each of the Examples and Comparative Examples, three test pieces as described above were prepared. The cotton was removed from an arbitrarily selected one of the three test pieces after leaving the test piece to stand for 36 hours, and the test piece was visually checked. The other two of the three test pieces were allowed to stand for 72 hours, whereafter the cotton was removed and the test pieces were visually checked to evaluate the chemical resistance. The chemical resistance was evaluated based on the presence or absence of crack in the test pieces according to the following evaluation criteria. The results are shown in Table 2.

(Evaluation Criteria)

○: No breakage or cracking occurred even after 72 hours.

Δ: Breakage and cracking occurred after a mount time of 1 hour to less than 72 hours.

X: Breakage and cracking occurred after a mount time of less than 1 hour.

[Evaluation of Moldability]

Following the same procedures as in the above Examples and Comparative Examples, a set of 10 tee joints for each of the Examples and Comparative Examples was produced, and visual observation was made to check whether or not molding defects (mainly, short shot due to insufficient filling with the resin at the end of the mold cavity) occurred in the socket sections of the tee joints. The moldability was evaluated according to the following evaluation criteria. The results are shown in Table 2. 》 Evaluation Criteria 》

○: None of the 10 tee joints suffered molding defects.

X: At least one of the 10 tee joints suffered molding defects.

[Evaluation of Water Cut-Off Performance]

The tee joints obtained in the above Examples and Comparative Examples were 1.5 used as test samples, and two of the socket sections of each of the test samples were closed with a closing jig. A pipe coated with an adhesive at one end thereof was inserted into and joined with the remaining one socket section, and the adhesive was dried at room temperature (20 to 30° C.) for 24 hours to form a piping structure.

Then, a water pressure of 0.35 MPa was applied from the other end of the pipe and held for 1 minute, and the occurrence of water leakage from the joint between the socket section and the pipe was visually checked. The water cut-off performance was evaluated according to the following evaluation criteria. The results are shown in Table 2.

》 Evaluation Criteria 》

○: No water leakage occurred from the joint.

X: Water leakage occurred from the joint.

[Evaluation of Haze]

The socket section of the tee joint obtained in each of the above Examples and Comparative Examples was cut to collect a test piece, and the haze thereof was measured using a haze meter (NDH7000SP, manufactured by Nippon Denshoku industries Co., Ltd.) according to HS K7136. The results are shown in Table 2.

TABLE 2

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Resin | Composition (% by mass) | Acrylonitrile | 41 | 33 | 45 | 43 | 33 | 33 | — | 33 | 45 |
|  |  | Butadiene (rubber component) | 13 | 20 | 31 | 40 | 20 | 20 | 30 | 20 | 30 |
|  |  | Acrylic rubber (rubber component) | — | — | — | — | — | — | — | — | 0.5 |
|  |  | Styrene | 16 | 18 | 24 | 17 | 18 | 18 | 35 | 18 | 24 |
|  |  | Methyl methacrylate | 30 | 29 | — | — | 29 | 29 | 35 | 29 | 0.5 |
| Pipe joint | MFR (g/10 min) |  | 40 | 16 | 9 | 5 | 16 | 16 | 50 | 16 | 9 |

TABLE 2-continued

| | | | | | | | | | | |
|---|---|---|---|---|---|---|---|---|---|---|
| Main body | Thermal resistance (K/W) | 0.14 | 0.14 | 0.14 | 0.14 | 0.18 | 0.18 | 0.14 | 0.14 | 0.14 |
| | Expansion ratio (times) | 1.8 | 1.8 | 1.8 | 1.8 | 1.5 | 2.2 | 1.8 | 1.8 | 1.8 |
| | Main body thickness (mm) | 10 | 10 | 10 | 10 | 10 | 10 | 10 | 10 | 10 |
| Socket section | Socket section length L (mm) | 22 | 22 | 22 | 22 | 22 | 22 | 22 | 22 | 22 |
| | Socket section thickness d (mm) | 3.7 | 4.4 | 4.9 | 5.3 | 4.4 | 4.4 | 3.0 | 4.4 | 4.9 |
| | L/d ratio | 5.9 | 5.0 | 4.5 | 4.2 | 5.0 | 5.0 | 8.0 | 5.0 | 4.5 |
| Evaluation | Impact resistance | ○ | ○ | ○ | ○ | ○ | ○ | ○ | ○ | ○ |
| | Chemical resistance | ○ | Δ | X | X | Δ | Δ | X | Δ | ○ |
| | Moldability | ○ | ○ | ○ | ○ | ○ | ○ | ○ | ○ | ○ |
| | Water cut-off performance | ○ | ○ | ○ | ○ | ○ | ○ | ○ | ○ | ○ |
| | Haze | 28 | 43 | opaque | opaque | 43 | 43 | 5 | 65 | opaque |

| | | | Ex. 10 | Ex. 11 | Comp. Ex. 1 | Comp. Ex. 2 | Comp. Ex. 3 | Comp Ex. 4 |
|---|---|---|---|---|---|---|---|---|
| Resin | Composition (% by mass) | Acrylonitrile | 43 | 33 | 49 | 39 | 33 | 26 |
| | | Butadiene (rubber component) | 38 | 20 | 3 | 52 | 20 | 10 |
| | | Acrylic rubber (rubber component) | 1 | — | — | — | — | — |
| | | Styrene | 17 | 18 | 16 | 9 | 18 | 29 |
| | | Methyl methacrylate | 1 | 29 | 32 | — | 29 | 35 |
| Pipe joint | MFR (g/10 min) | | 5 | 16 | 95 | 2 | 16 | 25 |
| Main body | Thermal resistance (K/W) | | 0.14 | 0.14 | 0.14 | 0.14 | 0.14 | 0.14 |
| | Expansion ratio (times) | | 1.8 | 1.8 | 1.8 | 1.8 | 1.8 | 1.8 |
| | Main body thickness (mm) | | 10 | 10 | 10 | 10 | 10 | 10 |
| Socket section | Socket section length L (mm) | | 22 | 28 | 22 | 22 | 11 | 30 |
| | Socket section thickness d (mm) | | 5.3 | 3.0 | 4.4 | 4.4 | 5.8 | 2.6 |
| | L/d ratio | | 4.2 | 9.3 | 5.0 | 5.0 | 1.9 | 11.5 |
| Evaluation | Impact resistance | | ○ | Δ | X | ○ | ○ | X |
| | Chemical resistance | | ○ | Δ | ○ | X | Δ | ○ |
| | Moldability | | ○ | Δ | ○ | X | ○ | X |
| | Water cut-off performance | | ○ | ○ | ○ | ○ | X | ○ |
| | Haze | | opaque | 43 | 15 | opaque | 43 | 18 |

As shown in Table 2, in Examples 1 to 11 to which the present invention was applied, the evaluation of the impact resistance was "○", indicating that the strength of the pipe joint was excellent. Further, it was also found that the water cut-off performance of the pipe joint was satisfactory.

On the other hand, in Comparative Example 1 in which the amount of the rubber component (butadiene) was less than 10% by mass, based on the total mass of the resin, the impact resistance was evaluated as "X". In Comparative Example 2 in which the amount of the rubber component was more than 45% by mass, based on the total mass of the resin, the moldability was evaluated as "X".

In Comparative Example 3 in which the L/d ratio was less than 2.0, the water cut-off performance was evaluated as "X". In Comparative Example 4 in which the L/d ratio was more than 10.0, the impact resistance and the moldability were evaluated as "X".

Thus, it was found that the pipe joint of the present invention not only show sufficient heat insulation performance even without increasing the thickness or expansion ratio of a foamed layer, but also are excellent in moldability, water cut-off performance and strength.

DESCRIPTION OF THE REFERENCE SIGNS

1 Pipe joint
10 Main body
10a, 10b, 10c Opening
12a, 12b, 12c Step
13 Peripheral wall
14 Injection gate
20a, 20b, 20c Socket section
21a, 21b, 21c Base end
22a, 22b, 22c Opening end
30 Foamed resin layer
50 Non-foamed resin layer

The invention claimed is:

1. A pipe joint comprising a tubular main body and a socket section integrally formed with the tubular main body,
    wherein the tubular main body has a flow path inside, and is formed of a resin comprising an acrylate polymer and a copolymer having
    (i) a vinyl cyanide monomer unit selected from the group consisting of acrylonitrile, methacrylonitrile, and mixtures thereof,
    (ii) a rubber component selected from the group consisting of diene rubber, acrylic rubber, and mixtures thereof, and
    (iii) an aromatic vinyl monomer unit selected from the group consisting of styrene, α-methylstyrene, β-methylstyrene, 4-methylstyrene, β-bromostyrene, and mixtures thereof,
    wherein an amount of the vinyl cyanide monomer unit is 15% by mass or more to 45% by mass or less, based on a total mass of the resin,
    wherein the tubular main body has a foamed resin layer and a non-foamed resin layer covering the foamed resin layer,
    wherein an amount of the rubber component in the foamed resin layer is 10% by mass or more and 45% by mass or less, based on a total mass of the resin contained in the foamed resin layer, as determined by pyrolysis-gas chromatography/mass spectrometry,
    wherein an amount of the rubber component in the non-foamed resin layer is 10% by mass or more and 45% by mass or less, based on a total mass of the resin contained in the non-foamed resin layer, as determined by pyrolysis-gas chromatography/mass spectrometry, and wherein a ratio L/d of length L from a base end to an opening end of the socket section to a thickness d of the socket section at the opening end is 4.2 or more and 9.0 or less.

2. The pipe joint according to claim 1, wherein the main body has a thermal resistance of 0.04 K/W or more.

3. A piping structure comprising the pipe joint of claim 1, and a pipe inserted into and connected to the socket section of the pipe joint.

4. A piping structure comprising the pipe joint of claim 2, and a pipe inserted into and connected to the socket section of the pipe joint.

5. The pipe joint according to claim 1, wherein the amount of the vinyl cyanide monomer unit is 41% by mass or more and 45% by mass or less, based on the total mass of the resin, and the ratio L/d is 4.2 or more and 5.9 or less.

6. A pipe joint comprising a tubular main body and a socket section integrally formed with the main body,
    wherein the tubular main body has a flow path inside, and is formed of a resin comprising an acrylate polymer and a copolymer having
    (i) a vinyl cyanide monomer unit,
    (ii) a rubber component, and
    (iii) an aromatic vinyl monomer unit,
    wherein an amount of the vinyl cyanide monomer unit is 15% by mass or more to 45% by mass or less, based on the total mass of the resin,
    wherein the main body has a foamed resin layer and a non-foamed resin layer covering the foamed resin layer,
    wherein the amount of the rubber component in the foamed resin layer is 10% by mass or more and 45% by mass or less, based on a total mass of the resin contained in the foamed resin layer, as determined by pyrolysis-gas chromatography/mass spectrometry,
    wherein the amount of the rubber component in the non-foamed resin layer is 10% by mass or more and 45% by mass or less, based on a total mass of the resin contained in the non-foamed resin layer, as determined by pyrolysis-gas chromatography/mass spectrometry,
    wherein a ratio L/d of length L from a base end to an opening end of the socket section to a thickness d of the socket section at the opening end is 4.2 or more and 9.0 or less, and
    wherein the main body has a thermal resistance of 0.04 K/W or more.

7. The pipe joint according to claim 6, wherein the vinyl cyanide monomer unit is selected from the group consisting of acrylonitrile, methacrylonitrile, and mixtures thereof; the rubber component is selected from the group consisting of diene rubber, acrylic rubber, and mixtures thereof; and the aromatic vinyl monomer unit is selected from the group consisting of styrene, α-methylstyrene, β-methylstyrene, 4-methylstyrene, β-bromostyrene, and mixtures thereof.

8. A piping structure comprising the pipe joint of claim 6, and a pipe inserted into and connected to the socket section of the pipe joint.

9. A piping structure comprising the pipe joint of claim 7, and a pipe inserted into and connected to the socket section of the pipe joint.

10. The pipe joint according to claim 6, wherein the amount of the vinyl cyanide monomer unit is 41% by mass or more and 45% by mass or less, based on the total mass of the resin, and the ratio L/d is 4.2 or more and 5.9 or less.

* * * * *